Patented Jan. 31, 1928.

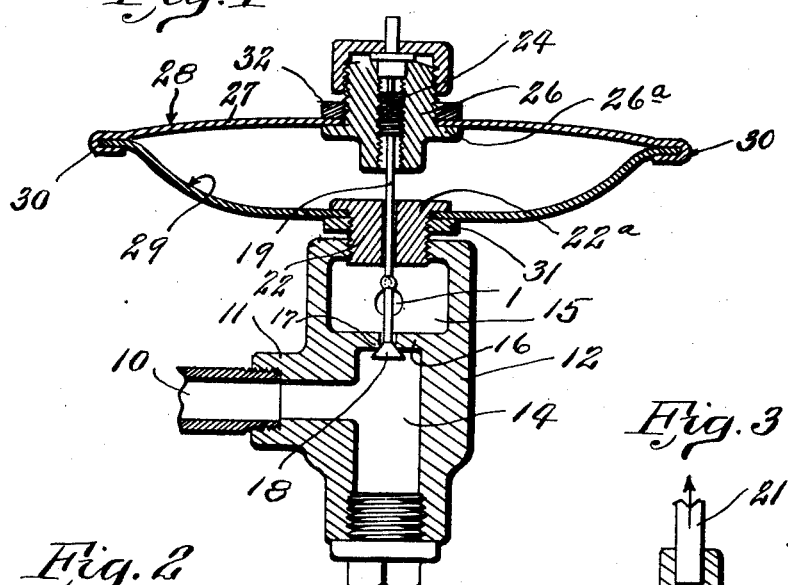

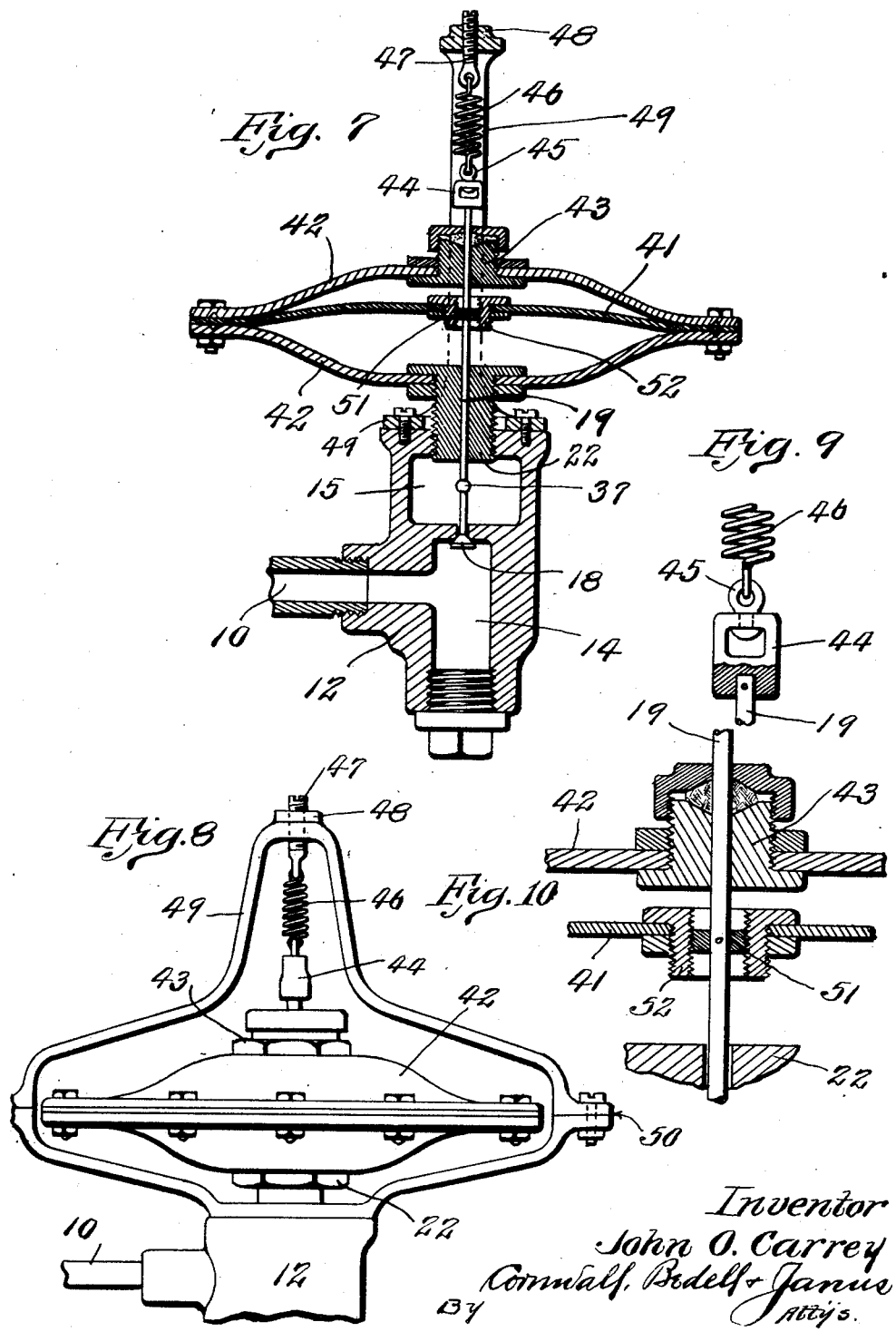

1,657,740

UNITED STATES PATENT OFFICE.

JOHN O. CARREY, OF ST. LOUIS, MISSOURI, ASSIGNOR TO CARREY-MORSE ENGINEERING COMPANY, OF ST. LOUIS, MISSOURI, A CORPORATION OF MISSOURI.

EXPANSION VALVE.

Application filed August 4, 1924. Serial No. 730,111.

This invention relates generally to pressure control valves and more particularly to expansion valves for refrigerating apparatus.

The objects of the invention are to provide a valve which is simple in operation, can be manufactured at low cost and contains but few parts, thereby reducing to a minimum the danger of it getting out of order.

Further objects of the invention are to provide a valve having a valve casing divided into two compartments, the communication between said compartments being effected through an orifice or opening of a predetermined size so as to permit a predetermined amount of fluid to pass therethrough, and to provide a valve for controlling said communication, said valve being automatically operated to close said opening when the pressure in one of the compartments reaches a predetermined degree.

Still further objects of the invention are to provide a valve, the valve member of which is capable of universal movement in order to effect the proper seating thereof, irrespective of the alignment of the main section of the valve stem and to provide simple and efficient means for adjusting said valve member.

With these and other objects in view, my invention consists in certain novel features of construction and arrangement of parts, hereinafter more fully described and claimed, and illustrated in the accompanying drawings, in which—

Figure 1 is a vertical cross section through the valve.

Figure 2 is an enlarged cross section through the upper end of the valve structure.

Figure 3 is a horizontal cross section taken on line 3—3 of Figure 1.

Figure 4 is a detail view showing the flexible connection between the two sections of the valve stem.

Figure 5 is an enlarged detail view showing the valve member moved from its seat.

Figure 6 is a detail view showing one method of sealing the joints between the flexible wall of the expansible member and its connections.

Figure 7 is a vertical cross section through a modified form of the valve.

Figure 8 is a side elevational view taken at right angles to Figure 7.

Figure 9 is a detail view showing the swivel connection between the valve stem and the spring.

Figure 10 is an enlarged detail view showing the adjustable operative connection between the valve stem and the flexible wall of the fluid pressure member.

The present invention has for its object the provision of an automatically operated valve for controlling the flow of refrigerant from the condensing element of a refrigerating apparatus to the expansion or cooling element thereof, whereby when the pressure created by the expansion of the refrigerant in the cooling element reaches a predetermined degree, said valve is operated to close the communication between said elements and cut off the flow of refrigerant to the cooling or expansion element. The valve then remains closed until the pressure in the expansion element falls below a predetermined point whereupon, suction produced in said expansion element by the operation of the compressor causes the flexible wall or walls of said pressure member to collapse, thereby unseating said valve and opening communication between said valve chambers.

Referring by numerals to the accompanying drawings, 10 indicates a pipe, one end of which is connected to the inlet connection 11 of a valve casing 12. This pipe is connected to a condensing element, not shown, and serves to convey the refrigerant from said element through said inlet connection 11 to a receiving chamber or compartment 14 formed in said valve casing. An expansion chamber 15 is located in said casing above chamber 14 and is separated therefrom by a partition wall 16 having an orifice or opening 17 through which communication between said chambers is established.

A valve member 18 carried by the lower end of a stem 19 is adapted to close said orifice and control the admission of fluid from chamber 14 to chamber 15. An outlet 20 is arranged in chamber 15 and has connected thereto one end of a pipe 21, the other end of which is connected to the cooling or refrigerating element of the apparatus. Stem 19 extends upwardly through a plug 22 which is screw-seated in the upper end of valve casing 12. The upper end of stem 19 is fixed in a screw plug 24 which is screw-seated in a threaded aperture 25 formed in a plug 26. This plug 26 is arranged in a centrally disposed opening formed in the upper flexible wall 27 of an expansible member 28 and plug 22 is seated in a centrally disposed opening formed in the lower flexible wall 29 of said expansible member. The annular edges of these flexible walls are secured together to form a fluid tight point as indicated at 30.

Plug 22 has an annular flange 22ª which is designed to bear against the inner face of wall 29 and a nut 31 is threaded on plug 22 and engages the outer face of said wall 29, thereby securely clamping plug 22 in position on wall 29. Similarly plug 26 is provided with an annular flange 26ª which rests against the inner face of wall 27 and a nut 32 is threaded on said plug 26 and bears against the outer face of wall 27, thereby securely attaching plug 26 in position in wall 28. Thus a sealed joint is provided between each plug and the corresponding wall of these joints may be further sealed, if so desired, by soldering or welding the joints as shown in Figure 6.

A member 34 is rotatably seated in the upper end of plug 26 and depending from the lower end of said member is a fin or blade 35 which engages a slot 36 diametrically disposed in the upper end of screw 24. An extension 34ª projects upwardly from member 34 and is preferably noncircular in cross section so that it can be engaged by a suitable handle or a wrench and turned in the proper direction to operate screw 24, thereby moving the valve stem and the valve member carried thereby in vertical plane so as to adjust said valve member relative to the orifice in partition wall 16. Extension 34ª may be provided with an opening 34ᵇ for the reception of a proper tool for turning member 34 when it is not desired to use a handle or a wrench.

In order to insure perfect seating of the valve and prevent bending or sticking thereof or of the valve stem, the latter is preferably made in two sections, namely, the operating section 19ª and the valve section 19ᵇ, and said sections are connected by a universal joint 37, preferably of the ball and socket type, which permits the valve member 18 to be moved upwardly or downwardly when screw 24 is operated and which at the same time allows said valve member to occupy a position out of alignment with the operating section 19ª.

A cap 38 having a suitable opening for accommodating extension 34ª is screw-seated on plug 26 and serves to retain said member 34 in position on said plug. A screw-plug 39 is screw-seated in the lower end of valve casing 12 and closes the lower end of chamber 14.

In the operation of the device, assuming the valve occupies an open or collapsed position, the refrigerant passes from chamber 14 through orifice 17 to expansion chamber 15, wherein it expands and enters pipe 21. Portion of the gaseous refrigerant contained in chamber 15 enters through the bearing in plug 22 expansible member 27 and the pressure thus created in said member causes the flexible walls thereof to expand in axial direction, thereby actuating the valve stem 19 and causing the valve member 18 to be moved to its seat and close the orifice 17. The communication between the chambers being now interrupted, the refrigerant can no longer pass into the expansion chamber 15 and the valve will remain seated until the pressure in the expansion element and chamber 15 to which said element is connected will have fallen below a predetermined degree, whereupon suction produced in the expansion element and in the expansible member 27 by the operation of the compressor will cause the flexible walls of said member 27 to collapse thereby unseating said valve and opening communication between chambers 14 and 15.

In the modified form shown in Figures 7 to 10, instead of using a flexible expansible member and connecting the valve stem 19 to one of the walls thereof, said valve stem has an operative connection with a flexible or diaphragm member 41 which operates in a diaphragm chamber formed by two dished members 42. Said valve stem projects upwardly through a bearing 43 provided with suitable packing and fixed in the upper one of said members 41, and the extreme end of said stem has fixed thereto a connector 44 to which is swiveled, in axial alignment with valve stem 19, an eye 45. This eye forms attaching means for the lower end of an extension spring 46, the opposite end of which is connected to the lower end of a set screw 47 which is adjustably mounted in a bearing 48 formed in the upper end of a frame or bridle 49. This frame is preferably made in two pieces secured together at 50 for the purpose of facilitating the installation of the device in position. The lower portion of said frame is preferably fixed to the valve casing 12 and forms a stationary support for the parts associated with said frame.

The operative connection between the valve stem 19 and the flexible wall or diaphragm 41 comprises a screw plug 51 which is fixed in any suitable manner to said stem and is screw-seated in a sleeve 52 secured in any suitable manner to the flexible wall 41. Thus when stem 19 is turned by means of connector 44, valve 18 by virtue of the threaded engagement between the screw plug 51 and sleeve 52 is adjusted relative to its seat. Connector 44 permits adjustment of the valve stem and at the same time, by virtue of the swiveling connection between said connector and the spring, permits the adjustment of said spring by means of the set screw 47 without effecting the adjustment of the valve stem. The flexible wall 41 is held in extended position by spring 46, thereby maintaining the valve in closed position.

When the pressure in the expansion chamber 15 falls below a pre-arranged degree, suction produced in said expansion chamber causes the flexible wall 41 to collapse, thereby unseating said valve and opening communication between the inlet and outlet or expansion chamber.

When the pressure in the expansion or outlet chamber 15 reaches a proper point, the collapsed flexible wall 41 assumes, under the influence of spring 46, its normal or extended position, thereby seating said valve and closing communication between inlet and outlet chambers.

A valve of my improved construction is simple in operation and positive in action, can be readily adjusted to suit the requirements of the particular system with which it is to be used and can be manufactured at low cost.

While I have shown and described the preferred forms of my improved valve, it is obvious that various changes in the construction and arrangements of parts of my invention can be made and substituted for those herein shown and described without departing from the spirit of the invention.

I claim:

1. In a valve construction, the combination of a casing having inlet and outlet chambers communicating through a valve opening, a valve disposed in said inlet chamber for opening and closing said valve opening, a lenticular-shaped expansible member secured to said casing and communicating with said outlet chamber, said lenticular member having a flexible wall expansible with the pressure in said outlet chamber, a valve stem disposed axially in said outlet chamber and said expansible member and having its lower end fixed to said valve, a flexible joint in said stem disposed at a point betwen said valve and said expansible member, a plug secured to the flexible wall of said expansible member and provided with a threaded bore, a screw seated in said bore and having fixed thereto the upper end of said stem for adjusting said stem axially, an adjusting member seated in said plug for free rotative movement and having nonrotative engagement with said screw for actuating the latter, said adjusting member being provided with an outwardly projecting portion, and a cap removably secured to said plug for retaining said adjusting member in position thereon and provided with a central aperture for receiving said projecting portion.

2. In a valve construction, the combination of a casing having inlet and outlet chambers communicating through a valve opening, a valve disposed in said inlet chamber for controlling said valve opening, a lenticular-shaped pressure member secured to said casing and communicating with said outlet chamber, said lenticular member having a flexible wall operable by the fluid pressure in said outlet chamber, a valve stem disposed axially in said outlet chamber and said pressure member and having its lower end fixed to said valve, a universal joint in said stem arranged at a point between said valve and said pressure member, a plug secured to said flexible wall and provided with a threaded bore, a screw fixed to said stem and screw seated in said bore for adjusting said stem axially, an operative extension associated with said screw and projecting outwardly from said pressure member, and a cap removably secured to said pressure member for sealing the point of egress of said extension.

In testimony whereof I hereunto affix my signature this 29th day of July, 1924.

JOHN O. CARREY.